United States Patent Office 3,312,643
Patented Apr. 4, 1967

3,312,643
METHOD OF PREPARING LIGNIN REINFORCED RUBBER AND PRODUCT
Frank J. Ball, Charleston, S.C., assignor to West Virginia Pulp and Paper Company, New York, N.Y., a corporation of Delaware
No Drawing. Filed Mar. 20, 1961, Ser. No. 96,728
13 Claims. (Cl. 260—17.5)

This invention relates to methods of preparing lignin reinforced rubber stock and to the improved rubber stock obtained thereby.

In U.S. Patent No. 2,608,537 to Pollak, a method of incorporating lignin into rubber by joint precipitation of lignin and latex was disclosed. By the employment of this process lignin reinforced rubbers could be obtained which in many respects were equal or superior to carbon black rubbers. Typical properties of lignin reinforced rubbers prepared according to the teachings of Pollak employing kraft pine lignin with a butadiene styrene rubber such as types 1502 or 2111 generally possess properties within the following ranges.

| Property | Range |
|---|---|
| Modulus, p.s.i. | 500–700 |
| Tensile, p.s.i. | 2800–3200 |
| Hardness, Shore A | 70–80 |
| Tear, lbs./in. | 300–400 |
| NBS Abrasion index | 90–110 |
| De Mattia flex growth, 1000 cycles to 0.5 in. | 80–120 |

It will be observed that for tire tread use the modulus and abrasion values of these rubbers are relatively low and that the hardness is relatively high. Subjecting the rubber stock to heat treatments above 300° F. has been known to improve these properties. Such heat treatment may be conducted either dynamically or statically, although dynamic heat treatment is much preferred. Methods of carrying out this heat treatment employing a very highly oxidized lignin is disclosed in British Patent 781,019.

Unfortunately, normally recovered kraft pine lignins, which have the highest fusion temperatures of any of the alkali lignins, will not withstand heat treatment at 300° F. or above without undergoing fusion with resultant loss rather than gain in properties. This fact is well illustrated by the following optimum results obtained when kraft pine lignin-rubber stock was subjected to Banbury treatment for 5 minutes at maximum temperatures of 313 and 394° F.

I have found that by incorporating formaldehyde into the aqueous medium containing the lignin prior to filtering and drying that a reaction between the lignin and formaldehyde can be induced which markedly changes the characteristics of the lignin and the properties of the rubber stock. The most notable change in the characteristic of the lignin is in the increase in heat resistance. Improvements in the rubber having the formaldehyde modified lignin incorporated therein include increases in modulus and abrasion resistance, making the rubber much more suitable for use in vehicle tires.

The increase in heat resistance of the lignin resulting from the reaction with formaldehyde is extremely important from several standpoints. The first is that it permits heat treatment of the dried lignin-rubber stock at temperatures above 300° F. Heat treatment of a lignin-reinforced rubber stock, whether carried out dynamically as in a Banbury or statically, greatly improves the viscosity of the raw stock and the hardness and heat build-up of the cured stock. The heat treatment also causes an additional increase in the modulus and abrasion resistance of the cured stock over that obtainable utilizing a formaldehyde modified lignin-rubber stock without heat treatment. Non-modified lignins, as has been previously indicated, cannot be heat treated in this manner since they fuse at these temperatures above 300° F. resulting in serious degradation of the properties of the rubber stock. Typically, kraft pine lignin has a dry fusion temperature in the range of 350 to 410° F. The fusion point of the kraft pine lignin, however, is apparently greatly decreased in a rubber system due to pressure and shearing forces during processing and fusion therein generally occurs at temperatures between about 240 and 260° F. Other types of lignins such as kraft hardwood or soda pine have dry fusion temperatures of about 250 to 300° F. and undergo fusion in rubber systems at even lower temperatures than the kraft pine lignin. Generally it has been necessary to employ highly oxidized lignins with dry fusion temperatures above about 480° F. in order to obtain sufficient heat resistance in the lignin to withstand heat treatment.

The increased heat resistance of the formaldehyde reacted lignins is also of great benefit in practicing methods of heating the slurry of coprecipitate particles before filtering and drying to obtain high solids filter cake. The fusion temperatures of lignin in an aqueous system such as is present in the slurry of coprecipitate particles is much lower than in dry rubber systems. Kraft pine lignin

| Maximum Banbury Temperature, ° F. | Cure Time, min. | Modulus, p.s.i. | Tensile, p.s.i. | Hardness, Shore A | Tear, lbs./in. | De Mattia Flex Growth, 1,000 cycles to 0.5 in. | Goodrich Heat Buildup, ° F. | NBS Abrasion Index |
|---|---|---|---|---|---|---|---|---|
| 313 | 100 | 390 | 1,890 | 63 | 150 | 142 | 54 | 66 |
| 394 | 40 | 900 | 1,490 | 63 | 165 | 34 | 42 | 101 |

These rubbers, due to their extremely low order of properties, are of course unsuitable for vehicle tire use.

As disclosed in U.S. 2,608,537, the coprecipitation process for reinforcing rubber with lignin comprises preparing a mixture of an aqueous alkaline lignin solution and a rubber latex. The lignin and rubber in this mixture are jointly precipitated by adding the mixture to an acid solution to yield a slurry of particles wherein the lignin is very intimately dispersed in the rubber. The lignin-rubber particles are then filtered, washed, dewatered, and dried. The dried lignin-rubber can then be processed and cured in similar manner to that of carbon black masterbatch.

in such water systems will generally fuse at temperatures as low as 160 to 180° F. Heating of the slurry in order to improve the solids content must be conducted at temperatures above 175° F. and preferably at much higher temperatures. While the normal kraft pine lignin will generally fuse during this heating, formaldehyde-reacted lignin coprecipitate can be heated to temperatures of up to 210–220° F. or higher without any serious fusion. The exact temperature to which the slurry may be heated without fusion of lignin is dependent upon the degree of reaction effected between the lignin and formaldehyde.

Although several processes have previously been proposed to improve the characteristics of lignin reinforced rubber stocks to make them better suited for tire tread use, none of these proposals have been completely successful. U.S. Patent 2,845,397, for example, discloses a process wherein the lignin while in aqueous solution prior to coprecipitation with the latex is treated with a urea type material and formaldehyde. Unfortunately such a process, while improving certain properties of the rubber stock such as abrasion resistance and modulus, yields a very hard rubber. The hardness of this stock even after being appreciably decreased by a heat treatment in the Banbury is still well above the desired limits. From the work which has been done in conjunction with the present invention, it is apparent that the urea type material when employed with the formaldehyde in treating the lignin has a very detrimental effect upon the hardness properties of the cured rubber without contributing to any beneficial results. Thus, the added cost of the urea type material not only is wasted but actually is harmful.

It may be noted, however, that such a treatment of the lignin with urea and formaldehyde will cause an increase in the heat resistance of the lignin and permit heat treatment without causing serious fusion of the lignin. This fact is somewhat obscured in 2,845,397 by the fact that a lignin which was oxidized by contact with air during processing was employed in the examples therein as evidenced by the fusion temperature of this lignin.

In British Patent 781,152 a process is disclosed wherein an aldehyde is milled into a dry lignin-rubber mixture and the combined material subjected to a heat treatment. Since the addition of the aldehyde to the lignin-rubber mixture is necessarily accomplished at high temperature, the aldehydes employed must be a liquid or solid having boiling or sublimation temperatures above 175° F. These aldehydes employable in such a process are all relatively expensive. Due to the nature of these aldehydes and the solid state conditions under which reaction occurs, the increase in heat resistance of the lignin obtainable through such a process is very small, although this fact is obscured since an oxidized lignin of sufficient heat resistance to withstand heat treatment without modification was employed in the examples. It should be noted that due to the limited reaction obtainable in the solid state conditions, the same degree of improvement, particularly as regards abrasion resistance, cannot be obtained. It will also be observed that the practice of heating the slurry of lignin-rubber particles described briefly hereinabove to improve the physical properties and solids content of the filter cake cannot be employed in conjunction with the practice of the British patent as any improvement in the heat resistance of the lignin is not obtained until after the lignin-rubber particles have been filtered and dried.

In the practice of this invention the formaldehyde may be added to the lignin in an aqueous system either before or after coprecipitation. The formaldehyde may merely be dissolved in the lignin solution and then coprecipitated with the latex or it may be added to the slurry after coprecipitation and before dewatering. Whether the formaldehyde is added to the lignin-rubber system prior to or after the coprecipitation, it is preferable that increased reaction between the lignin and formaldehyde be brought about by the application of heat. When the formaldehyde is added to the lignin solution prior to coprecipitation, either in the presence or absence of latex, it has been found that the best results for producing rubber stock for tire tread are achieved by heating the lignin and formaldehyde together for a sufficient time to cause between 0.7 and 1.8 moles of formaldehyde to react with one mole of lignin prior to effecting coprecipitation. The temperatures employed are relatively unimportant except that at temperatures below about 150° F., the reaction proceeds rather slowly and a long reaction time will be required.

The quantity of formaldehyde present will, of course, greatly affect the time and temperature required. An excess of formaldehyde over that desired to react with the lignin will cause more rapid reaction. With no added catalyst, generally 4 to 6 hours at 200 to 210° F. will be required to effect essentially complete reaction of the formaldehyde with the lignin when between about 0.6 and 2.4 moles of formaldehyde are present in the reaction mixture per mole of lignin. Conducting the reaction so as to effect complete reaction, at high formaldehyde to lignin ratios above about 1.5 to 1, however, promotes excessive lignin to lignin reaction and results in extremely boardy rubber products. Consequently, it is advisable to conduct the reaction under such conditions that a substantial quantity of the formaldehyde remains unreacted, i.e., until about 5 to 10% free formaldehyde remains in the solution. Typical preferred conditions are about 2 hours at 210° F. If the formaldehyde is added to the slurry of lignin-rubber coprecipitate particles, the best results have been achieved by heating the slurry to temperatures between 175 and 210° F. for 1 to 30 minutes. It will be noted that the formaldehyde reacts with the lignin under both the alkaline conditions existing in the lignin solution prior to coprecipitation and under acid conditions existing after coprecipitation with the reaction proceeding much more rapidly under acid conditions.

Instead of introducing the formaldehyde or formaldehyde-reacted lignin directly into the latex or rubber, it is possible to react the lignin and formaldehyde together and to recover this improved reinforcing agent in dry powdered form. To incorporate this dry powder into the latex, it is redissolved in aqueous alkali solution and coprecipitated with the latex in the usual manner. While this method suffers from several obvious disadvantages, it does permit the preparation of the formaldehyde-reacted lignin at sites removed from the area in which the rubber processing is conducted. Recovery of the formaldehyde-reacted lignin may be accomplished by acidification to precipitate the lignin followed by filtering and drying or by evaporation of the water in a process such as spray drying. Evaporation of the water appears to be preferred since the acidification promotes rather rapid reaction and may, unless carefully controlled, result in sufficient cross linkage of the lignin so that the lignin becomes insoluble in alkali solution.

The production of improved lignin reinforcing agents through the reaction with formaldehyde, while somewhat dependent upon the conditions under which the reaction takes place, i.e., the time and temperature of reaction and the relative concentration of reactants, is primarily dependent upon the quantity of formaldehyde which is actually added to the lignin. Unfortunately, the quantity of formaldehyde which has reacted cannot be easily determined directly and must be determined indirectly. The method employed herein has been to determine the free formaldehyde in the reaction mixture by the hydroxylamine hydrochloride method. The difference between the quantity of the free formaldehyde remaining subtracted from the original quantity of formaldehyde added to the reaction mixture is considered to be the quantity of formaldehyde that reacted with the lignin. While this method presents some margin for error due to such things as loss of formaldehyde and possible side reaction, these errors are believed to be very slight and not to affect the results to any appreciable degree. By employing this method, it has been determined that about 0.1 to 0.2 mole of formaldehyde react with a mole of lignin of assumed molecular weight of 1000 during acidification without prior heating to promote reaction. When heating is employed prior to precipitation to promote increased addition of formaldehyde to the lignin, the quantity of formaldehyde reacted with the lignin is determined by the time and temperature and quantity of reactants employed. While the properties of the modified lignin are primarily dependent on the quantity of formaldehyde reacted, some difference in lignins having the same degree of formaldehyde addition have been noted. For example, a lignin reacted in the presence of a large quantity of formaldehyde for a relatively short period of time has a slightly lower heat resistance than a lignin reacted in the presence of a much smaller quantity of formaldehyde for a longer period of time, although the two lignins have the same quantity of formaldehyde actually reacted therewith. This factor is believed to be due to increased cross linkage of the lignin through the added methylol groups to form methylene bridges during extended reaction times. Excessive cross linkage due to excessively long reaction times, e.g., longer than 3 hours at 210° F. will adversely affect the properties of the rubber and should be avoided.

Lignin can relatively easily be combined with from about 0.1 to 2.4 moles of formaldehyde per mole of lignin. The exact amount of formaldehyde which is desirably reacted with lignin is greatly dependent upon the type of rubber in which the lignin is to be incorporated and upon the particular properties desired in the cured product. The lignins containing only small amounts of formaldehyde, i.e., 0.1 to 0.6 mole per mole of lignin, yield rubbers with comparatively slight increases in heat resistance and properties. High formaldehyde addition, i.e., 1.9 to 2.4 moles of formaldehyde per mole of lignin, while providing very great increases in heat resistance, abrasion resistance and modulus, tends to make a very tough and hard product which may not be desirable for tire treads but which may be desirable in other applications. In the middle range of formaldehyde, i.e., 0.7 to 1.8 moles of formaldehyde per mole of lignin, a compromise is generally reached in which rubber stock most suitable for tire tread use can be obtained. The most desirable level of formaldehyde addition within this middle range will vary somewhat depending on the type rubber employed. For example, using a straight butadiene styrene rubber stock such as 1502, about 0.7 to 1.5 moles of formaldehyde per mole of lignin is preferred. For oil extended stocks a more highly reacted lignin is preferred, on the order of 1.0 to 1.8 moles of formaldehyde per mole of lignin.

Oil-extended rubbers, having 20 to 50 parts of oil per 100 parts of rubber, reinforced with formaldehyde-reacted lignin, in addition to having very excellent physical properties have been found to possess outstanding processing characteristics and can be very easily extruded in forms with sharp edges. Consequently, the formaldehyde-reacted, lignin-reinforced, oil-extended rubbers are very particularly adapted to tire tread use because of their properties, processability, and cost.

The improvements obtainable by reacting the lignin with formaldehyde are believed to be due to two factors; the linkage of lignin molecules together through methylene bridges and the addition of methylol groups to the lignin molecule. The reaction of formaldehyde with lignin under alkaline conditions is believed to be much like that of formaldehyde with phenol in the production of phenolic resins. During reaction the formaldehyde adds to the ring structure of the lignin to form a methylolated structure. A portion of the methylol groups during continued reaction will react with another lignin molecule splitting out water to create methylene linkages between the lignin molecules. The cross linking of the lignin molecules in this fashion would easily account for the improved heat resistance of the lignin. It does not, however, appear wholely desirable that all the methylol groups form methylene bridges. The free methylol groups on the lignin apparently react with the rubber to increase the reinforcement ability of the lignin thus accounting for the increased properties obtained. Evidence of the increased reactivity of these methylol groups of the lignin has been obtained by selective extraction with benzene and sodium hydroxide of dried non-cured coprecipitate prepared using the formaldehyde-reacted lignin and unmodified lignin.

The improvements obtained by utilizing the process of this invention are applicable to all the butadiene-type rubbers which are prepared in latex form and can be coprecipitated with the lignin. While the butadiene-styrene and natural rubbers are primarily employed in tire treads and the process of this invention has been developed in regard to improving the properties of lignin reinforced rubbers for this use, the properties of other rubbers are also improved in many regards. Thus, my process may be employed equally as well with butadiene-acrylonitrile and chlorobutadiene rubbers.

In most tire tread applications, the lignin loading based on rubber solids will generally range between about 40 and 70, although in some cases somewhat higher or lower loadings may be desirable. In very highly oil-extended rubbers, suitable lignin loadings for tire treads may be as high as 100 parts of lignin per 100 parts of rubber. In nontire tread applications, the lignin loading is dependent only upon the properties desired nad may be well outside the limits for tire tread loadings. In general, though, the lignin loading will range from about 25 to 100.

Any of the various types of alkali lignins may be employed in the practice of this invention. Kraft pine lignin, however, due to its higher fusion temperature is generally to be preferred over the other normally recovered alkali lignins. It is, of course, possible to modify the normally recovered alkali lignins such as by oxidation or demethylation without interfering with the reaction of the lignin with the formaldehyde. In fact, some of these modified alkali lignins may have definite advantages over the use of the non-modified lignins.

As used herein, the average molecular weight of lignin is assumed to be 1000.

The practice of this invention is shown in the following examples. The lignin employed in these examples was a sulfate pine lignin which had a sintering point in the free acid form of about 212° C. The compounding and curing materials referred to by tradename in the following examples were composed of the following chemical ingredients:

BRS 700 _____ Coal tar plasticizer.
BRT #4 _____ Coal tar plasticizer.
Altax _____ Benzothiazyl disulfide.
Cumate _____ Copper diethyl dithiocarbamate.
Santocure ____ N,cyclohexylbenzothiazol-2-sulfenamide.
Neozone D __ Phenyl-beta-napthylamine.
Flexone 3C __ N,isopropyl-N'-phenyl-P-phenylene diamine.
U.O.P. 88 ____ N,N'-dioctyl-p-phenylene diamine.

The first two examples illustrate the preferred method of practice of this invention utilizing a butadiene styrene rubber. This preferred practice, wherein between 0.7 and 1.5 moles of formaldehyde are reacted with a mole of lignin under alkaline conditions prior to coprecipitation, produces a rubber stock which is particularly suitable for tire tread use.

*Example 1*

19.5 pounds of moist kraft pine sodium lignate equivalent to 17.85 pounds of precipitatable lignin were dissolved in 20 gallons of water at 190° F. 3.31 pounds of inhibited 37% formaldehyde solution containing 1.24 pounds of formaldehyde were added to the lignin solution and the resultant solution heated to 150° F. for 30 minutes. The reacted solution was permitted to cool and remain at room temperature overnight. Titration of the solution for free formaldehyde indicated that about 0.70 mole of formaldehyde had reacted per mole of lignin. The lignin solution was then mixed with 170 pounds of a butadiene styrene latex (type 2111) containing 34 pounds of rubber solids. The lignin solution-latex mixture was slowly added to 25 gallons of acid water at 180° F. containing 1030 ml. of 78% sulfuric acid and the resultant slurry heated by direct steam injection to 180° F. and permitted to cool. The slurry was filtered and washed and the filter cake dried at 230° F. overnight.

900 grams of the dried coprecipitate were masticated for 2.5 minutes in a Banbury when 60 grams of BRS 700, 12 grams stearic acid, 30 grams zinc oxide, and 6 grams Neozone D were added. Mastication was continued for an additional 2½ minutes when the stock was dumped. Maximum temperature of the stock during mastication was 405° F. The stock was milled together with 9.0 grams Santocure, 3.0 grams diphenyl guanidine, 10.8 grams sulfur and 6.0 grams Flexone 3C, sheeted out and cured at 287° F. The following properties were obtained.

with 211 grams of tall oil and 80 grams of 50% sodium hydroxide solution were mixed with the lignin solution. The mixture at a temperature of 120° F. was added to 20 gallons of acid water at 180° F. containing 900 ml. of 78% sulfuric acid. The resultant slurry was heated briefly to 215° F. and then filtered, washed and dried overnight at 230° F.

1050 grams portions of the dried coprecipitate were masticated in a model B Banbury for 2.5 minutes when 14

| Cure Time, min. | Modulus, p.s.i. | Tensile, p.s.i. | Elong., Percent | Hardness, Shore A | Tear, lbs./in. | De Mattia Flex Growth, in. at 200,000 cycles | Goodrich Heat Build-up, °F. | NBS Abrasion Index |
|---|---|---|---|---|---|---|---|---|
| 30 | 1,080 | 3,080 | 600 | 60 | 185 | ------ | ------ | ------ |
| 40 | 1,150 | 2,980 | 560 | 59 | 195 | 0.09 | 50 | 182 |
| 60 | 1,380 | 3,020 | 520 | 62 | 235 | ------ | ------ | ------ |

*Example 2*

17 pounds of moist kraft pine sodium lignate equivalent to 15.1 pounds of precipitatable lignin were dissolved in 20 gallons of water at 190° F. 25 grams of sodium hydroxide dissolved in 1000 ml. of water and 2.18 pounds of 37% inhibited formaldehyde solution containing 0.805 pound of formaldehyde were added to the lignin solution. This solution was heated to 210° F. and maintained at that temperature for 120 minutes. Determination of the free formaldehyde content by hydroxylamine hydrochloride titration indicated that 1.1 moles of formaldehyde had reacted per mole of lignin. The total quantity of the reacted lignin solution was mixed with 147.5 pounds of a butadiene styrene latex (type 2111) containing 30.2 pounds of rubber solids. The aqueous lignin-latex mixture was in turn slowly added to 20 gallons of acid water at 160° F. containing 900 ml. of 78% sulfuric acid. The slurry was heated by direct steam injection from 138° F. to 200° F. and permitted to cool. The slurry was then filtered and washed, and the washed cake dried overnight at 230° F.

900 grams of the dried coprecipitate were masticated for 2.5 minutes when 60 grams BRS 700, 30 grams zinc oxide, 6 grams stearic acid, 6 grams Neozone D, and 6 grams U.O.P. 88 were added. Mastication was continued for an additional 2.5 minutes and the stock dumped. Maximum temperature of the stock during mastication was 400° F. The stock was milled on a roll mill at 180° F. and 9 grams Santocure, 3 grams diphenyl guanidine and 10.8 grams sulfur incorporated into the stock. After sheeting out, the stock was cured at 302° F. and the following properties obtained.

grams BRS 700, 35 grams zinc oxide, 7 grams stearic acid, 7 grams Neozone D and 7 grams U.O.P. 88 were added. Mastication was continued for an additional 2.0 minutes after addition of these materials. Maximum temperature reached in the Banbury was 370° F. The masticated stock was roll milled for 3 minutes at 180° F. when 10.5 grams Santocure, 2.8 grams diphenyl guanidine, and 0.7 gram Cumate were added and milled in for 3 minutes. 10.5 grams of sulfur were milled in and the stock sheeted out. The stock was cured at 287° F. and the following optimum results obtained.

Cure time, min. -------------------------------- 20
Modulus, p.s.i. ------------------------------- 1070
Tensile, p.s.i. ------------------------------- 2630
Elong., percent ------------------------------- 580
Harness, Shore A ------------------------------ 55-61
Tear, lbs./in. -------------------------------- 355
De Mattia Flex Growth, 1000 cycles to 0.5 in. -- 110
Goodrich heat buildup, °F. -------------------- 55
NBS abrasion index ---------------------------- 194

*Example 4*

33.5 pounds of moist sodium lignate equivalent to 29.6 pounds of precipitatable lignin were dissolved in 16 gallons of water. 3.66 pounds of 37% inhibited formaldehyde solution (1.35 pounds of formaldehyde) were added to the lignin solution and the mixture heated in a closed vessel to 210° F. Heating was continued for 120 minutes when the mixture was cooled. Titration of the solution with hydroxylamine hydrochloride indicated a residual free formaldehyde content of 0.13 mole of formaldehyde

| Cure Time, min. | Modulus, p.s.i. | Tensile, p.s.i. | Elong., Percent | Hardness, Shore A | Tear, lbs./in. | De Mattia Flex Growth, in. at 200,000 cycles | Goodrich Heat Build-up, °F. | NBS Abrasion Index |
|---|---|---|---|---|---|---|---|---|
| 40 | 780 | 2,780 | 590 | 61 | 390 | ------ | ------ | ------ |
| 50 | 1,000 | 2,900 | 550 | 62 | 375 | 0.495 | 73 | 187 |
| 60 | 1,080 | 2,930 | 580 | 62 | 360 | ------ | ------ | ------ |

The following two examples illustrate the preferred practice of this invention in preparing tire tread stock utilizing oil extended rubber.

*Example 3*

34 pounds of moist kraft pine sodium lignate equivalent to 28.6 pounds of precipitatable lignin were dissolved in 20 gallons of water at 200° F. 1975 grams of a 37% formalin solution were added to the lignin solution and the resultant solution heated to 210° F. and held at that temperature under pressure for 2 hours. Determination of the free formaldehyde indicated that 1.1 moles of formaldehyde had reacted per mole of lignin. 253 pounds of butadiene-styrene high-Mooney latex (type 1712) containing 41.8 pounds of rubber solids and 15.5 pounds of Sundex 53 (aromatic oil)) mixed in 2 gallons of water per 1000 grams of solids and that approximately 1.40 moles of formaldehyde had reacted per mole of lignin.

171.5 pounds of this solution were mixed with 138 pounds of a high Mooney butadiene styrene rubber latex (type 1712) of 16.5% solids containing 22.8 pounds of rubber solids and with 8.53 pounds of Sundex 53 aromatic processing oil emulsified in 4000 ml. of water with 120 grams of a distilled tall oil having a rosin content of about 28% and 40 grams of 50% sodium hydroxide solution. The resultant mixture was then added slowly to 20 gallons of acid water at 190° F. containing 600 ml. of 78% sulfuric acid to coprecipitate the lignin, rubber and oil. The resultant slurry was heated to 215° F. by direct injection of steam and immediately permitted to cool to 150° F. when it was filtered and washed. The filtered cake was dried overnight at 230° F.

960 grams of the dried coprecipitate were masticated in a model B Banbury for 3.0 minutes when 30 grams zinc oxide, 12 grams BRS 700, 6 grams U.O.P. 88, and 6 grams Neozone D were added. Mastication was continued for an additional 2.0 minutes. The initial three minutes of mastication was conducted at high speed of 155 r.p.m. and the final 2 minutes at low speed of 77 r.p.m. The temperature of the stock rose to 450° F. during the initial 3 minutes and decreased to 375° F. at the time of dumping.

The total quantity of masticated stock, 1015 grams, was placed on a cool roll mill and milled for 9 minutes before sheeting off. After the first 3 minutes of milling, 9 grams of Altax and 3 grams methyl zimate were added. 10.8 grams of sulfur were added 3 minutes later. The rubber stock was cured at 287° F. and was found to have the following properties.

A split tread tire was prepared using the above rubber and a carbon black reinforced rubber having a NBS Abrasion Index of about 2000 employed in the manufacture of tread stock for first line tires. Curing of the tread was accomplished at 287° F. for 50 minutes. The following results were obtained upon road testing of this tire.

| Loads, pounds | Speed, m.p.h. | Total Miles | Miles per 0.001 in. | | Abrasion Lignin Tread as percent of CB tread |
|---|---|---|---|---|---|
| | | | Carbon Black | Lignin | |
| 1,085 | 60 | 1,800 | 85 | 98 | 116 |
| | | 3,600 | 106 | 116 | 110 |
| | | 5,400 | 108 | 125 | 116 |
| | | 7,200 | 94 | 102 | 110 |
| 1,193 | 75 | 1,000 | 42 | 56 | 133 |
| | | 1,800 | 48 | 60 | 124 |

| Cure Time, min. | Modulus, p.s.i. | Tensile, p.s.i. | Elong., Percent | Hardness, Shore A | Tear, lbs./in. | De Mattia Flex Growth, 1,000 cycles up to 0.5 in. | Goodrich Heat Build-up, °F. | NBS Abrasion Index |
|---|---|---|---|---|---|---|---|---|
| 25 | 1,270 | 2,530 | 450 | 58 | 305 | 30 | 50 | 255 |
| 35 | 1,430 | 2,520 | 430 | 60 | 290 | | | |
| 45 | 1,670 | 2,720 | 410 | 60 | 275 | | | |

The following example illustrates the practice of this invention wherein no reaction between the lignin and formaldehyde is conducted prior to precipitation but the slurry containing the lignin-rubber and formaldehyde is heated to promote reaction under acidic conditions.

*Example 5*

25 pounds of moist kraft pine sodium lignate equivalent to 17 pounds of precipitatable lignin were dissolved in 16 gallons of water. 3.33 pounds of a 37% formaldehyde solution were added to the sodium lignate solution followed by 21.5 gallons of a butadiene-styrene latex containing 34 pounds of rubber solids. The lignin and rubber were coprecipitated by adding the lignin solution-latex mixture to 50 gallons of acid water containing 1600 ml. of concentrated (78%) sulfuric acid. The resulting coprecipitate slurry was heated to 185° F., allowed to cool, and then filtered, washed, and dried. 5 batches, each consisting of 900 grams of the dried coprecipitate, were masticated separately for 2½ minutes in a model B Banbury when 60 grams BRS 700, 12 grams stearic acid, 30 grams zinc oxide and 6 grams Neozone D were added to each batch. Mastication was continued for 2½ minutes when the stock was dumped. The temperature in the Banbury for the 5 batches ranged from 395 to 405° F. The 5 batches were combined on a roll mill with the following agents:

| | Parts |
|---|---|
| Coprecipitate stock | 168 |
| Santocure | 1.5 |
| Diphenyl guanidine | 0.5 |
| Flexone 3C | 1.0 |
| Sulfur | 1.8 |

The roll milling of the stock at 180° F. was continued for 20 minutes when the stock was sheeted out and subsequently cured at 287° F. The physical properties of the cured rubber were as follows:

The following example illustrates the practice of this invention wherein minimum reaction between the lignin and formaldehyde is effected. Under these conditions where no heating is conducted either prior to or after coprecipitation, about 0.1 to 0.2 mole of formaldehyde will generally react per mole of lignin.

*Example 6*

A lignin solution was prepared by dissolving 1540 grams of sodium lignate in 7000 ml. of water at 100° F. This sodium lignate was equivalent to approximately 1050 grams of precipitatable lignin. To this lignin solution 204 grams of a 37% formaldehyde solution were added to yield a solution containing approximately three moles of formaldehyde per mole of lignin. 10,800 mls. of a butadiene-styrene rubber latex emulsion containing 2100 grams of rubber solids was then added to the lignin-formaldehyde solution with agitation to produce a uniform mixture. This mixture in turn was added to 14 liters of water at 185° F. containing 175 ml. of 78% sulfuric acid causing the lignin and rubber to be precipitated. The coprecipitate particles were filtered and washed until the pH of the wash water reached 4.0. The resultant filter cake was dried overnight at 220° F.

A portion of this masterbatch was compounded in a normal manner on a cold mill at a temeprature of about 160° F. employing the following curing formula:

| | |
|---|---|
| Masterbatch | 150 |
| BRT #4 | 5 |
| Stearic acid | 1 |
| Altax | 1.5 |
| Zinc oxide | 5 |
| Cumate | 0.25 |
| Sulfur | 2 |
| Neozone D | 1 |

| Cure Time, min. | Modulus, p.s.i. | Tensile, p.s.i. | Elong., percent | Hardness, Shore A | Tear, lbs./in. | NBS Abrasion Index | De Mattia Flex Growth, 1,000 cycles to 0.5 in. |
|---|---|---|---|---|---|---|---|
| 30 | 40 | 1,850 | 700 | 59 | 310 | 195 | *0.422 |
| 40 | 730 | 2,330 | 693 | 58 | 380 | 271 | 184 |
| 60 | 810 | 2,810 | 707 | 60 | 420 | | |
| 75 | 960 | 3,000 | 670 | 61 | 395 | | |

*Width of crack growth at 200,000 cycles in inches.

The following table presents the physical properties of the cured rubber:

| Cure Time, min. | Modulus Stress at 300% Elongation, p.s.i. | Tensile Strength, p.s.i. | Elong., percent | Tear, lbs./in. | Hardness, Shore A |
|---|---|---|---|---|---|
| 20 | 800 | 3,380 | 560 | 370 | 84 |
| 45 | 840 | 3,640 | 580 | 360 | 84 |

Another portion of the masterbatch was subjected to dynamic heating in a model B Banbury using the following curing recipe:

| | |
|---|---|
| Masterbatch | 150 |
| BRT #4 | 5 |
| Stearic Acid | 2 |
| Altax | 1 |
| Litharge | 2 |
| Cumate | 0.3 |
| Neozone D | 1.5 |
| Sulfur | 2 |

The BRT #4, stearic acid, litharge and Neozone D were added to the masterbatch and mixed in a Banbury for 1.7 minutes at a maximum stock temperature of 410° F. The rubber was then milled for 20 minutes during which time the Altax, Cumate, and sulfur of the above recipe were added to the rubber. Curing of the rubber was accomplished at 287° F. Optimum properties were obtained at 30 minute cure and are presented below.

| | |
|---|---|
| Cure time, min. | 30 |
| Modulus stress at 300% elongation, p.s.i. | 1080 |
| Tensile strength, p.s.i. | 3030 |
| Elong., percent | 520 |
| Tear, lbs./in. | 380 |
| Hardness, Shore A | 57 |

Two factors should be noted from the above tables. The first is the increase in properties, particularly modulus obtainable through the use of formaldehyde even though heat treatment is not conducted. The second is the marked greater improvement, particularly in regard to modulus and hardness, possible through subjecting the formaldehyde reacted lignin to heat treatment. In addition, it will be noted that even the very small degree of reaction between the formaldehyde and lignin in this example imparted sufficient heat resistance to the lignin to permit heat treatment at very high temperature without causing fusion.

The following example illustrates the practice of this invention wherein the formaldehyde is added to the lignin-rubber slurry and reacted entirely under acidic conditions.

*Example 7*

600 grams of moist kraft pine sodium lignate equal to 400 grams of precipitatable lignin were dissolved in 3000 ml. of water at 200° F. 4100 ml. of a butadiene-styrene latex containing 800 grams of rubber solids were admixed with the lignin solution and the lignin and rubber in the resultant mixture coprecipitated by adding the mixture to 6000 ml. of acid water at 75° F. containing 75 ml. of concentrated (78%) sulfuric acid. 40 grams of a 37% formaldehyde solution were added to the coprecipitate slurry and the slurry was heated to 180° F. by direct steam injection and permitted to cool. The coprecipitate was then filtered, washed and dried.

300 grams of the coprecipitate were broken down on a roll mill for 10 minutes when 2 grams of stearic acid were added. 10 grams of BRT #4, 10 grams of zinc oxide, 3 grams of Altax, 0.6 gram of Cumate and 5 grams of sulfur were subsequently added to the roll mill at 5 minute intervals. The rubber was then sheeted out, cured at 287° F., and tested. The following table presents the results of the tests.

| Cure Time, min. | Modulus, p.s.i. | Tensile, p.s.i | Elongation, percent | Hardness, Shore A | Tear, lbs./in. |
|---|---|---|---|---|---|
| 30 | 800 | 3,380 | 660 | 84 | 380 |
| 40 | 750 | 3,600 | 690 | 81 | 380 |
| 60 | 830 | 3,300 | 610 | 82 | 350 |

The last example illustrates the practice of this invention wherein close to the maximum degree of reaction between the formaldehyde and lignin is affected prior to coprecipitation. It will be observed that such high reaction results in a very hard, boardy rubber stock which would not be satisfactory for tire tread use.

*Example 8*

38.8 pounds of moist kraft pine sodium lignate equivalent to 34.5 pounds of precipitatable lignin were dissolved in 40 gallons of water. 6.62 pounds of inhibited 37% formaldehyde solution containing 2.48 pounds of formaldehyde were added to the lignin solution and the resultant solution heated to 210° F. for 240 minutes in a closed vessel. Hydroxylamine hydrochloride determination of the free formaldehyde remaining indicated that 2.38 moles of formaldehyde had reacted per mole of lignin.

5540 grams of the reacted lignin solution were mixed with 4450 grams of an 18% solids butadiene styrene latex (type 2111) containing 800 grams of rubber. This mixture was in turn slowly added to 5000 ml. of acid water at 190° F. containing 65 ml. of 78% sulfuric acid to effect coprecipitation of the lignin and rubber. The slurry of coprecipitated particles was heated to 260° F. by direct steam injection and filtered and washed while hot. The filter cake was dried overnight at 230° F.

1050 grams of the dried coprecipitate were masticated for 2.5 minutes in a model B Banbury when 35 grams zinc oxide, 35 grams stearic acid, 70 grams BRS 700, and 7 grams U.O.P. 88 were added. Mastication was continued for an additional 2.5 minutes. Mastication was conducted entirely at low speed of 77 r.p.m. and maximum temperature of the stock was 415° F. The 978 grams of masticated stock was milled at 180° F. for 9 minutes and sheeted off. During milling 10.5 grams Santocure and 3.5 grams diphenyl guanidine were added after 3 minutes and 12.6 grams sulfur were added after 6 minutes. The milled stock was cured at 317° F. and tested with the following results.

| Cure Time, min. | Modulus, p.s.i. | Tensile, p.s.i. | Elong., Percent | Hardness, Shore A | Tear, lbs./in. | De Mattia Flex Growth, 1,000 cycles to 0.5 in. | Goodrich Heat Build-up, ° F. | NBS Abrasion Index |
|---|---|---|---|---|---|---|---|---|
| 10 | 1,940 | 2,180 | 340 | 83 | 285 | Less than 10 | 100 | 160 |
| 20 | 2,150 | 2,150 | 280 | 85 | 260 | | | |
| 30 | 2,190 | 2,190 | 250 | 86 | 285 | | | |

While this invention has been illustrated in connection with several specific examples, it is understood that the practice of this invention may be varied widely within the scope of the principles set forth hereinabove and of the appending claims.

I claim:
1. The method which comprises coprecipitating lignin and a butadiene type rubber to form a slurry of lignin-rubber particles, mixing formaldehyde with the slurry of lignin-rubber particles, and heating said slurry thereby causing reaction between the lignin and formaldehyde.

2. The method which comprises reacting in aqueous alkaline solution lignin with between about 0.1 to 2.5 moles per mole of lignin of a material consisting essentially of formaldehyde, mixing the solution of formaldehyde reacted lignin with a butadiene type rubber latex and coprecipitating the lignin and latex.

3. The method which comprises coprecipitating a butadiene type rubber with a reinforcing agent consisting essentially of lignin reacted with between 0.7 to 1.8 moles of formaldehyde per mole of lignin from an aqueous mixture thereof to produce a slurry of lignin-rubber coprecipitate particles, separating the supernatant liquid from the lignin-rubber particles and drying these particles, and thereafter subjecting the dried lignin-rubber coprecipitate to a heat treatment at a temperature in excess of 300° F.

4. The method which comprises coprecipitating a butadiene rubber with a reinforcing agent consisting essentially of lignin reacted with between 0.7 and 1.8 moles of formaldehyde per mole of lignin.

5. The method of claim 4 wherein the butadiene rubber is a butadiene styrene type rubber and is extended with 20 to 50 parts of oil per 100 parts of rubber and the lignin is reacted with from 1.0 to 1.8 moles of formaldehyde per mole of lignin.

6. A rubber stock comprising 100 parts by weight of a butadiene type rubber and from about 26 to 100 parts by weight of a reinforcing agent consisting essentially of lignin reacted with from about 0.1 to 2.5 moles of formaldehyde per mole of lignin.

7. A rubber stock comprising 100 parts by weight of a butadiene type rubber and from about 25 to 100 parts by weight of a reinforcing agent composed of lignin reacted with from about 0.7 to 1.8 moles of formaldehyde per mole of lignin.

8. A rubber stock comprising 100 parts by weight of a butadiene-styrene type rubber, 20 to 50 parts of oil, and from about 25 to 100 parts by weight of a reinforcing agent consisting essentially of lignin reacted with from about 1.0 to 1.8 moles of formaldehyde per mole of lignin.

9. A rubber stock comprising 100 parts by weight of a butadiene-styrene rubber and from about 25 to 100 parts by weight of a reinforcing agent composed of lignin reacted with from about 0.7 to 1.5 moles of formaldehyde per mole of lignin.

10. In the preparation of a lignin reinforced rubber by preparing a mixture of an aqueous alkaline solution of lignin and a butadiene type rubber latex, coprecipitating the lignin and rubber from the aqueous mixture to form an aqueous slurry of lignin-rubber particles, separating said particles from the supernatant liquid, drying the lignin rubber particles and compounding and curing the dried lignin-rubber mixture, the improvement which comprises adding a lignin reactive material consisting of formaldehyde to an aqueous system containing the lignin before the separation of the supernatant liquid from the coprecipitated lignin-rubber particles and heating the resultant aqueous system containing the lignin and formaldehyde at a temperature of at least 150° F. until about 0.6 to 2.5 moles of formaldehyde have reacted per mole of lignin.

11. The method of preparing a modified lignin product having improved characteristics as a reinforcing agent for rubber comprising preparing an aqueous alkaline solution containing one mole of lignin and from 0.6 to 2.5 moles of a reactant consisting essentially of formaldehyde, heating said solution at 150° F. for sufficient period of time to cause from 0.1 to 2.5 moles of formaldehyde to react with one mole of lignin, and thereafter drying the solution of formaldehyde reacted lignin to recover said modified lignin in a dry particulate form.

12. The modified lignin produced by the method of claim 11 which is soluble in water and aqueous alkaline solutions.

13. A cured rubber stock, comprising 100 parts by weight of a butadiene styrene rubber and from about 25 to 100 parts of a reinforcing agent consisting of the reaction product of one mole of lignin and between 0.1 and 2.5 moles of formaldehyde, which has been subjected to a dynamic heat treatment at a temperature above 300° F. for at least 2 minutes.

References Cited by the Examiner

UNITED STATES PATENTS

| 2,501,666 | 3/1950 | Evans | 260—17.5 |
| 2,890,183 | 6/1959 | Haxo, et al. | 260—17.5 |
| 3,167,523 | 1/1965 | Dimitri | 260—17.5 |

OTHER REFERENCES

Brauns: Chemistry of Lignin, 1952 Academic Press Inc., New York, pages 76–77.

SAMUEL H. BLECH, *Primary Examiner.*

M. STERMAN, W. H. SHORT, *Examiners.*

J. ZIEGLER, J. NORRIS, *Assistant Examiners.*